United States Patent

Boyd et al.

[11] 3,710,623
[45] Jan. 16, 1973

[54] MAGNETIC PICKUP ELEMENT ADAPTER FOR FLOWMETERS

[75] Inventors: Charles L. Boyd, Duncan, Okla.; James D. Roach, Yuma, Ariz.

[73] Assignee: Halliburton Company, Duncan, Okla.

[22] Filed: Jan. 20, 1972

[21] Appl. No.: 219,396

Related U.S. Application Data

[62] Division of Ser. No. 881,493, Dec. 2, 1969.

[52] U.S. Cl. ............................................... 73/231 R
[51] Int. Cl. ...................................................G01f 1/08
[58] Field of Search ........73/229, 230, 231; 324/174; 336/84, 135

[56] References Cited

UNITED STATES PATENTS

| | | | |
|---|---|---|---|
| 1,961,782 | 6/1934 | Rich | 324/70 X |
| 2,448,190 | 8/1948 | Olesky | 336/87 X |
| 3,053,087 | 9/1962 | Waugh | 73/231 |
| 3,121,330 | 2/1964 | Leslie et al. | 73/231 |
| 3,166,936 | 1/1965 | Fisher et al. | 73/231 |
| 3,398,577 | 8/1968 | Kovats et al. | 73/231 |
| 3,464,041 | 8/1969 | Waterman | 336/84 X |

*Primary Examiner*—James J. Gill
*Assistant Examiner*—Herbert Goldstein
*Attorney*—Michael J. Caddell

[57] ABSTRACT

A method and apparatus are provided for reducing the nonlinear readout characteristics of such magnetic sensing and measuring devices as turbine type flowmeters. An adapter bushing is used to mount an electromagnetic pickup element within a turbine type flowmeter. The body of the meter into which the pickup element is mounted consists of a material having a low permeability, while the adapter consists of a ferromagnetic material having a high permeability. In operation, the electromagnetic pickup element is disposed within the body of the device adjacent a moving member which is to be monitored. The surrounding adapter functions to shape the flux lines generated by the pickup element into a path having a low flux density in the area adjacent the moving member which low density, in turn, reduces the magnetic drag on such member.

1 Claim, 3 Drawing Figures

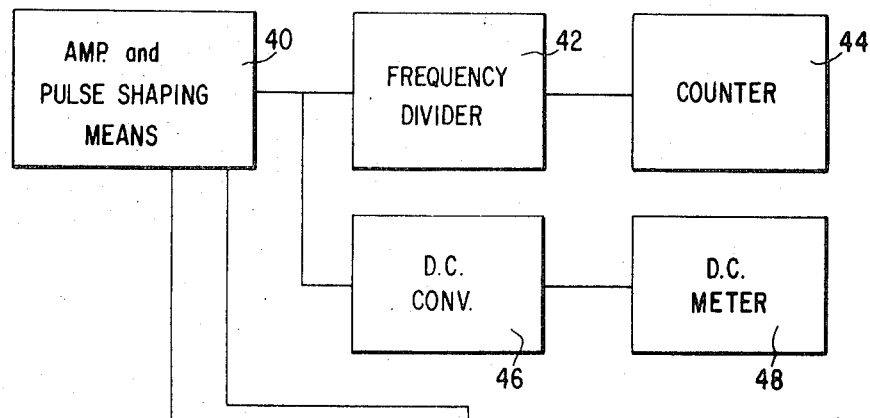
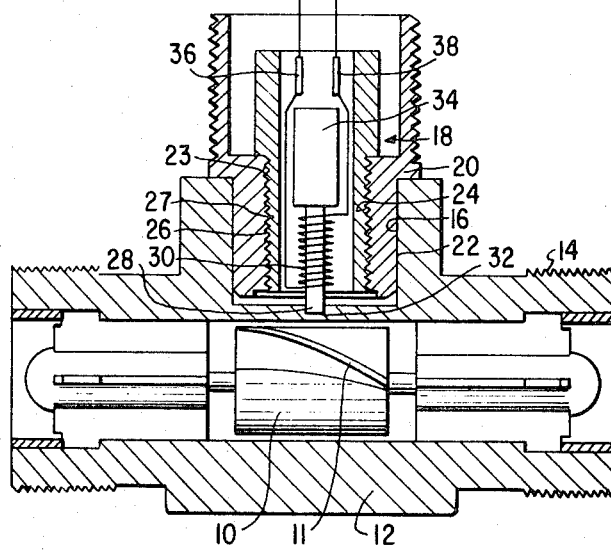
FIG. 1
FIG. 2
PRIOR ART
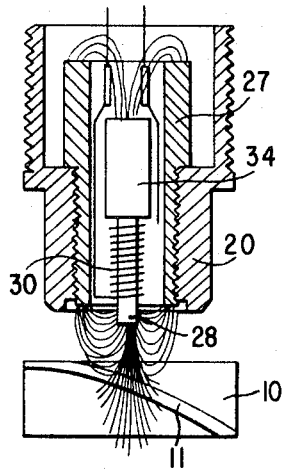
FIG. 3
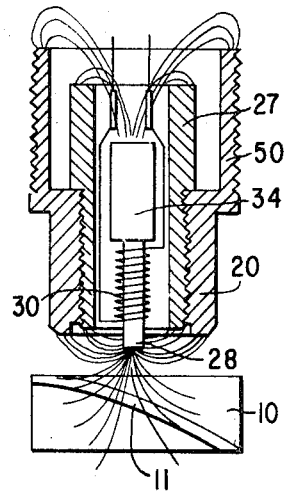

MAGNETIC PICKUP ELEMENT ADAPTER FOR FLOWMETERS

This is a division of application Ser. No. 881,493, filed Dec. 2, 1969.

BACKGROUND OF THE INVENTION

In sensing and measuring devices such as the turbine type flowmeter, it has been found that the use of electromagnetic pickup elements may result in nonlinear readout characteristics. After some investigation, it was discovered that the flux lines comprising the magnetic circuit of the pickup element were of an unusually high density in the area adjacent the rotating turbine wheel. This high density of flux, it was found, was placing a substantial drag on the rotor and was thereby inducing an undesirable nonlinear error in the readings derived from the device.

In small meters, the magnetic drag caused by a high flux density in the area of the rotor represents a sizeable error. The existing practice of constructing the pickup element adapter of the same relatively nonmagnetizable material as that comprising the body of the meter has aggravated the problem. This is because the flux lines have a tendency to form generally through the immediate structure of the pickup element itself so as to cause a sharp bending of the flux path adjacent the turbine rotor which bending is responsible for the high density of flux in the rotor.

OBJECTS AND SUMMARY OF THE INVENTION

It is therefore an object of the present invention to provide an improved adapter for mounting an electromagnetic pickup element within a sensing and measuring apparatus.

It is another object of the present invention to provide a means and a method for reducing the drag on the rotor of a turbine type flowmeter.

It is still another object of the present invention to provide an improved magnetic pickup element adapter for a sensing and measuring device which adapter is inexpensive and relatively easy to manufacture.

It is a further object of the present invention to provide an improved magnetic pickup element adapter which may be installed within existing measuring and sensing devices without modification of such devices.

It is still a further object of the present invention to provide an adapter for an electromagnetic pickup element which adapter improves the linearity of an associated measuring device having a rotor operating to cut the magnetic flux lines of a circuit generated by the element.

It is yet a further object of the present invention to provide a means and a method for shaping the magnetic circuit generated by an electromagnetic pickup element within a measuring and sensing device.

The above listed objects and those which will become apparent from a reading of the following detailed description are carried out by providing a magnetic pickup element adapter comprising a member consisting of a highly permeable material with respect to the permeability of the nonmovable members adjacent the pickup element. The flux lines generated from an electromagnetic pickup are then shaped to take a more open oval-like circuit pattern through the surrounding outer adapter and thereby form more gradual bends at the north and south poles thereof to reduce the flux density in these areas.

While the invention is particularly pointed out and distinctly claimed in the concluding portion of the specification, a preferred embodiment is disclosed in the following detailed description which may be taken in connection with the accompanying drawing in which:

FIG. 1 is an axial cross sectional view of a turbine type flowmeter incorporating the improved adapter of the present invention;

FIG. 2 is an axial cross sectional view of an electromagnetic pickup element within a prior art adapter and diagrammatically shows the flux lines comprising the narrow oval-like magnetic circuit generated by the pickup element;

FIG. 3 is an axial cross sectional view of an electromagnetic pickup element mounted within an adapter according to the present invention and shows the improved open magnetic circuit pattern formed thereby.

DETAILED DESCRIPTION OF THE PREFERRED EMBODIMENT

Referring now to the drawings in which like numerals are used to indicate like parts throughout the various views thereof, FIG. 1 shows an overall turbine type flowmeter system.

A rotor 10 having a plurality of blades 11 formed thereon is journalled within a generally cylindrical flowmeter casing 12 which consists of a material such as stainless steel having a low permeability so as to be relatively nonmagnetizable. The body 12 is provided with external threads 14 at each axial end for connection within a flow line. A cylindrical chamber 16 extends radially from the generally cylindrical surface of the body 12 and retains an electromagnetic pickup element denoted generally as 18. An adapter member 20 supports the element 18 within the chamber 16 and is used to provide flexibility in the field by permitting differently configured pickup elements to be readily mounted within variously configured flowmeter bodies. In accordance with the present invention, the adapter member 20 consists of a highly permeable ferromagnetic material such as a nickel or cobalt steel.

The adapter 20 may be formed as a bushing having a lower outer cylindrical surface 22 which snugly fits within the chamber 16 formed within the flowmeter body 12. A cylindrical axial bore 23 is formed through the lower portion of the adapter 20 and is provided with internal threads 24 used to engage outer threads 26 formed on the lower portion of the housing 27 of the electromagnetic pickup element 18. When the pickup element 18 is properly mounted within the adapter 20, a core piece 28 of the pickup element 18 having a coil 30 wrapped therearound is disposed in proximity with the rotor 10 journalled for rotation within the body 12. A small radially extending recess 32 may be formed within the body 12 of the flowmeter in the outer surface thereof to permit the core piece 28 to extend into close association with the rotor 10.

A permanent magnet 34 is attached to the upper end of the core piece 28 and the coil 30 surrounding the core piece 28 terminates at contact members 36 and 38.

In operation, the magnetic flux generated by the permanent magnet 34 is repeatedly cut as the blades 11 of the rotor 10 are moved with respect to the core piece 28. The change of flux, in turn, causes a voltage to be induced in the coil 30. The voltage generated in response to each blade 11 passing in proximity to the core piece 28 then appears on the contacts 36 and 38.

Circuitry may be provided for reading the speed of the rotor by applying the voltage from contacts 36 and 38 to an amplifier and pulse shaping means 40. The pulse shaping means 40 serves to provide flat-type or square-type voltage waves which are applied to a frequency dividing circuit 28 for reducing the frequency of the square-wave pulses by some predetermined factor. The output pulses of the frequency divider stage 42 may then be applied to a counting device 44. The output pulses of the pulse shaping circuit 40 may also be applied to a DC converting stage 46 which produces an output voltage having a definite amplitude corresponding with the frequency of the input signals supplied to the amplifier and pulse shaping means. The resulting DC output voltage may then be applied to a DC meter 48 which indicates the amplitude of the voltage and provides an indication of the rate or frequency of the pulses so as to ultimately indicate the speed of rotation of the rotor 10.

FIG. 2 shows the electromagnetic pickup element 18 of FIG. 1 mounted within a nonpermeable adapter typical of those currently in use in the field. As will be noted, the flux lines induced by the permanent magnet 34 have a tendency to take a path through the immediate housing 27 of the pickup element itself. Because of this, the flux lines are forced to take a very narrow oval pattern with sharp bends at both north and south poles so that a high flux density occurs in the area where the rotor 10 is disposed.

After discovering that the nonlinear characteristics of small turbine type flowmeters are substantially attributable to the drag caused by this high flux density in the area of the rotor, it was further discovered that, by constructing the adapter member 20 of a highly permeable material with respect to the housings 12 and 27, the nonlinearity of the meter may be reduced. This reduction is caused by forcing the flux lines to form a circuit through the adapter at a distance from the immediate casing 27 of the pickup element and the larger oval circuit so formed provides for more gradual bending of the flux lines at the two poles thereof so that the drag causing flux lines are less dense adjacent the rotor 20 as compared with the flux line pattern formed by existing adapters. The oval configuration of the circuit may be even further opened by making the upper portion 50 of the bushing 20 of a greater diameter than necessary to snugly engaged the upper portion of the pickup element housing 27. Conversely, the lower portion of the bushing 20 could be expanded in diameter to form the magnetic circuit with even more gradual bends adjacent the rotor than those illustrated in FIG. 3. Since the flux path does not adhere strictly to the configuration of the adapter 20, any widening of a portion thereof would tend to flatten out the bends of the flux path.

The reduced flux density now being cut by the blades 11 of the rotor 10 will, of course, result in a lower signal strength. However, the amplifier 40 may be used to compensate for this weakened signal strength without causing distortion.

It has been found that when the adapter 20 of the present invention is incorporated within small electromagnetic turbine type flowmeters, that the linearity of readout over a wide flow range is greatly improved.

A ⅝ inch diameter meter was experimentally tested over a flow range of 0.3 to 3.0 gallons per minute. It was found that, while the linearity of the meter using an existing nonpermeable electromagnetic pickup element adapter was ± 11.10 percent, the linearity of the same device incorporating the adapter of the present invention was ±1.43 percent. This is an improvement of approximately 1,000 percent which provides a new magnitude of meter reliability and renders such flowmeters far more practical than heretofore has been possible. Turbine type flowmeters embodying the adapter of the present invention have been placed in the field and are currently being tested to determine whether such an improvement of 1,000 percent may be maintained over a period of time under actual operating conditions.

It can thus be seen that an adapter for an electromagnetic pickup element used within a sensing an measuring device such as a turbine type flowmeter has been herein provided which adapter greatly improves the readout linearity of such devices.

It can further be seen that the adapter of the present invention may be of the same configuration as the nonmagnetizable existing adapters so that such existing adapters may be easily replaced in the field by the improved adapter. The adapter herein disclosed is of relatively simple configuration and lends itself to ease of manufacture. A portion of the drag on the moving members of equipment such as turbine type flowmeters has been discovered to be caused by magnetic drag and this drag is substantially reduced by the use of the adapter and method disclosed herein. By using an adapter of high permeability, the reliability and usefulness of small turbine type flowmeters has been greatly improved so as to give such devices a new significance in flow sensing and measuring applications.

While what has been disclosed herein is a preferred embodiment of the present invention, it is of course understood that various modifications and changes may be made therein without departing from the scope of the invention. It is therefore intended to cover in the appended claims all such devices as fall within the true spirit and scope of the present invention.

What we claim is:

1. A method for reducing drag on the rotor of a turbine flowmeter of the type having a plurality of blades journaled for rotation within a first housing means and having an electromagnetic pickup element in a second housing means in proximity with the rotor whereby the rotor cuts magnetic flux lines generated by the electromagnetic element to induce an intermittent measurable voltage, such flux lines tending to pass between said pickup element and said second housing means so as to produce a relatively high density flux pattern adjacent said rotors, comprising the steps of:

generating a magnetic circuit in the electromagnetic pickup element thereby causing flux lines to pass between the pickup element and said second housing means;

flattening said flux lines between said pickup element and second housing means thereby reducing the flux density in the flux field cut by said rotor; and rotating said rotor through said lower density field to induce said intermittent measurable voltage.

* * * * *